Aug. 6, 1974    R. L. GODINO ET AL    3,827,944
WAX CRYSTAL GROWTH CONTROL IN OIL DEWAXING PLANTS
Filed May 24, 1973    2 Sheets-Sheet 2

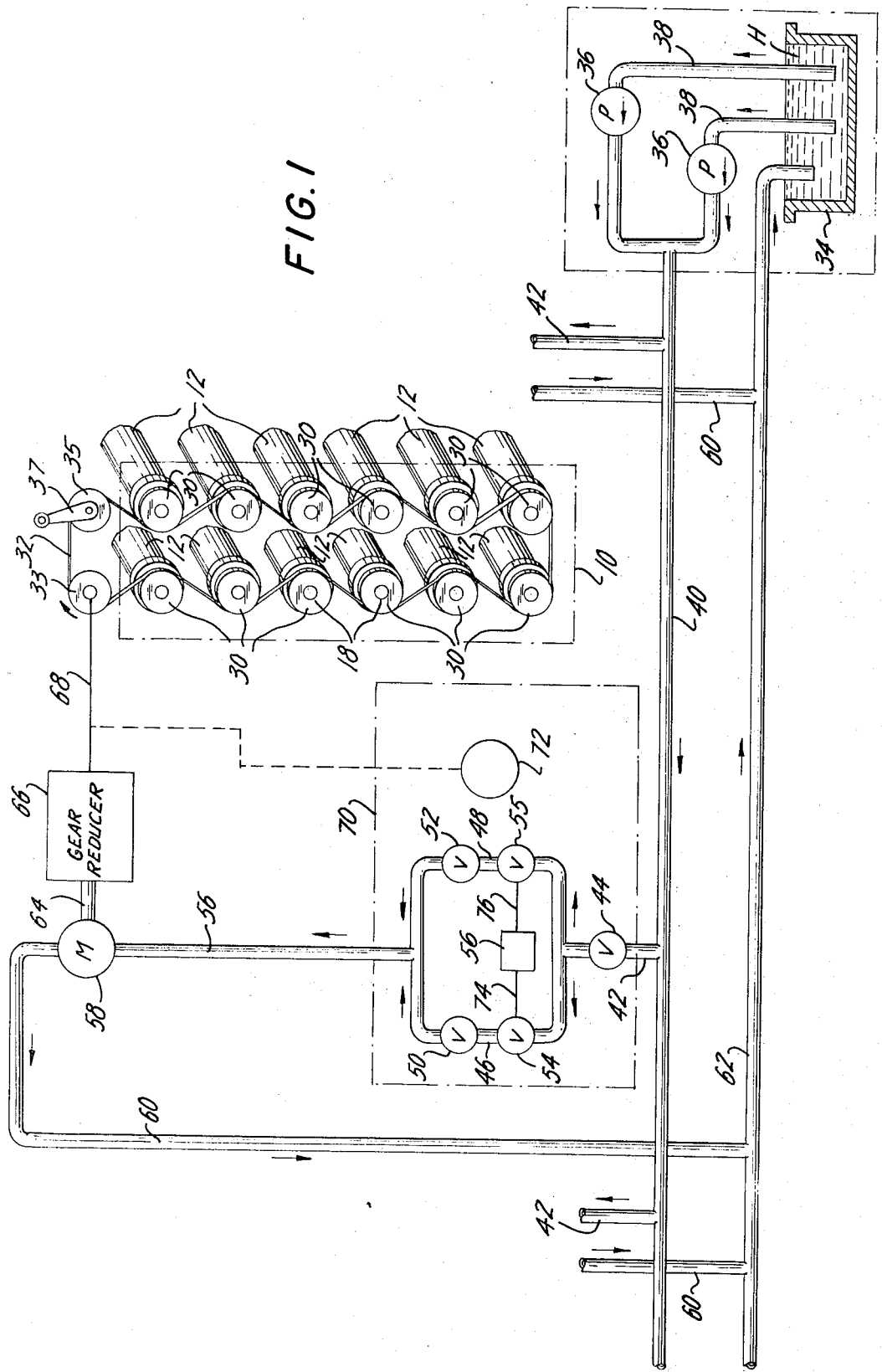

United States Patent Office 3,827,944
Patented Aug. 6, 1974

3,827,944
WAX CRYSTAL GROWTH CONTROL IN OIL DEWAXING PLANTS
Rino L. Godino, Livingston, and Oliver Morfit, Green Village, N.J., assignors to Foster Wheeler Corporation, Livingston, N.J.
Filed May 24, 1973, Ser. No. 363,707
Int. Cl. C10g 43/00; B01d 9/04
U.S. Cl. 196—14.5                                    12 Claims

ABSTRACT OF THE DISCLOSURE

The rate of wax crystal growth in an oil dewaxer having cooled pipes through which the oil is flowed and in which scrapers are rotated to remove the wax, is controlled to assure efficient filter operation downstream. The scrapers are rotated at a comparatively slow rotational speed for a given period of time to provide for optimum growth rate of wax crystals and then automatically rotated at a higher rate of speed to clean the interior of the pipe so that the wax can continue to crystallize.

BACKGROUND OF THE INVENTION

In the manufacture of lubricating oils, it is necessary to remove wax from the oil to lower the pour point to a temperature where it will flow freely at usual ambient temperatures.

The presence of wax and the concomitant high pour point is not acceptable in industry. For example, lubricating oils in automobiles must flow freely at temperatures which are well below the pour point of wax containing oils. If the wax were not removed from the oil, it would be almost impossible to turn over a cold engine to start it and even if the engine were started, the oil would not flow freely enough to properly lubricate the engine until it was sufficiently warmed up. As a result, considerable engine wear would take place each time the engine was operated at temperatures below the pour point.

Lubricating oil is usually dewaxed by mixing with solvents such as methyl ethyl ketone, toluene, acetone, naphtha, methylene chloride, 1,2-dichlorethane, MIBK, benzene, nitro-benzene, amylacetate, isoamyl ketone, either alone or mixtures of two or more of these solvents and then flowing through two types of heat exchangers, each of which comprises a plurality of pairs of coaxial pipes. In the first type of heat exchanger, which may be termed an "oil cooled exchanger," oil and the amorphous wax in it are flowed through the inner coaxial pipes which are cooled by a cool oil flowing in the annular spaces between the inner pipes and the outer pipes. The cool oil is usually oil which has been previously processed through the exchanger, that is, oil which has had its wax removed.

While the mixture of oil, amorphous wax and solvents is flowing through each inner piper, wax will crystallize on the cool inner surface of the inner pipe. It is removed by one or more scrapers which are rotated within the pipe and which bear against the inner surface of the inner pipe to remove the accumulated wax.

After leaving the oil cooled exchanger, the oil is flowed through another exchanger which is often called a "chiller" which is quite similar to the oil cooled exchanger, the principal difference being that the chiller is cooled by a refrigerant such as propane or ammonia which is flowed through the space between the inner and outer pipes. The chiller, as its name implies, is operated at temperatures lower than the oil cooled exchanger and its purpose is to remove wax which has not been removed by the oil cooled exchanger. The crystalline wax, which builds up on the inner surface of the inner pipe is removed by one or more scrapers rotating and bearing against the inner surface of the inner pipe just as in the oil cooled exchanger. The crystalline wax particles which break loose flow through the central pipe suspended in the oil to a filter feed tank and then to a filter which separates the wax from the oil. The oil is led from the filter back to the first exchanger to serve as a coolant before being exhausted as dewaxed oil, that is, the product of the process.

In operation, it is highly desirable that the exchangers and chillers be operated so that an optimum rate of wax crystal growth is attained. If the crystal growth rate is correct, filtration operation downstream can be carried on with a high degree of efficiency. If the wax crystal growth rate in the exchangers and chillers is not controlled within an acceptable range, the wax which forms on the inner pipes in the exchanger and/or chiller will contain more oil than it would if the wax crystal growth rate were kept within an optimum range of values.

If at the wax filter, wax is separated out with a considerable amount of entrained dewaxed oil, a considerable amount of valuable dewaxed oil is lost in the separation process.

Since the wax crystal growth rate is undesirable during the time the scrapers mechanism is rotated at any considerable speed, the scraper mechanism is conventionally rotated only when the wax build-up on the inner pipe has progressed to the point where it is desirable to remove it. The scrapers scrape the inner surface of the inner pipe clean. A clean surface is an ideal one to begin wax crystallization if acceptable growth rates are to be maintained.

One problem with this arrangement is that the initial torque necessary to start the scraper mechanism is high and consequently, the mechanism is often broken when the starting torque is applied.

SUMMARY OF THE INVENTION

It is an object of the present invention to overcome drawbacks found in the prior art such as those discussed above. Accordingly, a dewaxing unit in which oil containing amorphous wax and solvent is flowed through the inner of two coaxial pipes with a coolant flowing in the annular space between the inner and outer pipes so that wax crystallizes on the inside surface of the inner pipe and is removed by a scraper moving over and bearing against the inside surface, is provided with a speed control which allows the scraper to move at a slow speed for a predetermined time to allow a desired rate of wax crystal growth on the inside surface while simultaneously removing the wax and then at a higher speed for a predetermined time to clean the inner surface of the inner pipe so that the crystal growth rate will be within an optimum range.

BRIEF DESCRIPTION OF THE DRAWINGS

FIG. 1 is a schematic view of a portion of a dewaxing plant made in accordance with the present invention;

DETAILED DESCRIPTION OF THE PREFERRED EMBODIMENT

Figure 2:
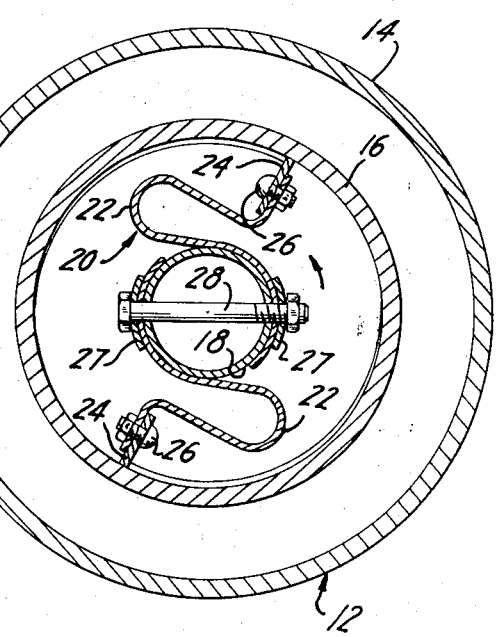
FIG. 2 is a view, partly in section, showing the interior of one of the coaxial pipe assemblies of the present invention with its associated scraping mechanism.

There is shown in FIG. 1 is a schematic view of the present invention as applied to a chiller 10. The chiller comprises a number of pipe assemblies 12 which as shown in FIG. 2 include an outer pipe 14 and an inner pipe 16.

Concentric with each of the pipes 14 and 16, and extending along the longitudinal axis of each of the pipe assemblies 12, are shafts 18. As shown in FIG. 2, each of the shafts 18 has attached to it a scraper 20. Actually, a number of scrapers 20 are spaced axially along the shaft 18, but only one of them is shown in FIG. 2 for clarity.

Each of the scrapers 20 includes a pair of springs 22, each of which is made up from a strip of spring metal and which has attached to it at its outer end a blade 24. Each blade 24 is fastened to the outer ends of one of the springs 22 by a bolt 26 which extends through the blade 24 and the associated spring 22. In FIG. 2, two springs 22 and two scrapers 24 are shown and the springs 22 are fastened to the shaft 18 on opposite sides of the shaft 18. Each spring 22 is held in place at its inner end by a clamp plate 27. The two clamp plates 27 are drawn together by a bolt 28 so that they each clamp between each of them and the shaft 18, one of the inner ends of the springs 22.

Each of the shafts 18 extends completely through an inner pipe 16 and protrudes beyond both that inner pipe 16 and the concentric outer pipe 14 at one end. Coolant such as propane or ammonia is fed through the annular space between the outer pipe 14 and the inner pipe 16. Oil which contains amorphous wax is flowed through the inner pipe 16. The drawings do not show the piping necessary to bring oil and coolant into and out of the pipe assemblies 12. This structure is old in the art and therefore will not be shown or explained in detail.

Figure 3:
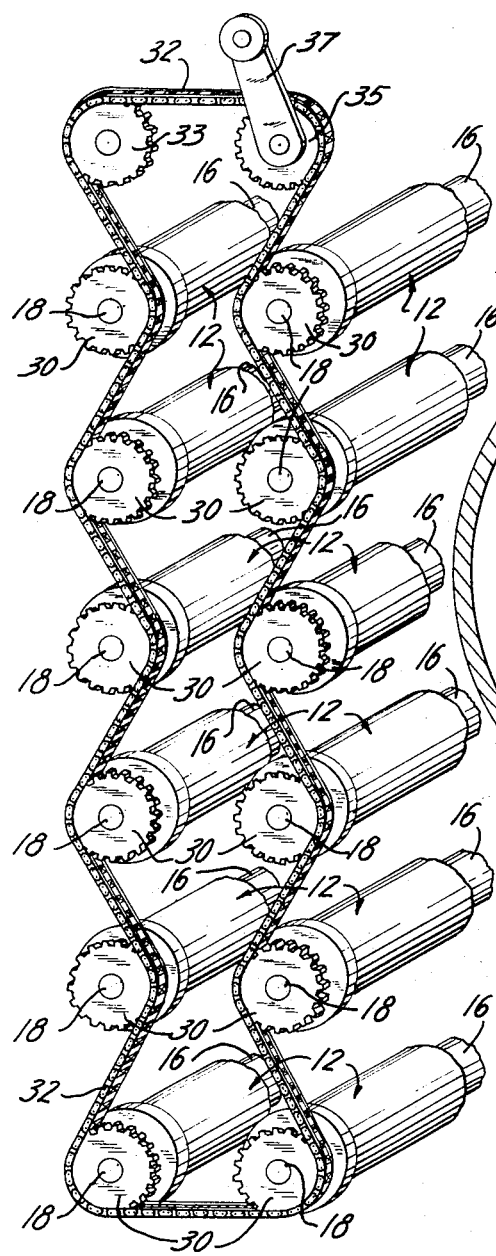
FIG. 3 is a view in elevation of the apparatus which is used either as an oil cooled exchanger or chiller in the schematic of FIG. 1.

The shafts 18 are concentric with the pipe assemblies 12, are all parallel to each other and the pipe assemblies 12 are arranged so that the shafts 18 each have an end lying in a common plane. On each of these ends is secured a sprocket 30 which meshes with a sprocket chain 32 as as shown in FIG. 3. A driver sprocket 33 drives the sprockets 30 through the chain 32. Tension in the chain 32 is maintained by an idler sprocket 35 mounted on an adjustable arm 39. Each of the scraper mechanisms 20 is arranged so that the bends in the spring 22 points generally in the direction the scraper mechanism is rotating. Since the shafts 18 will rotate in different directions because of the way they are engaged by the chain 32, the bends in the spring 22 will point in different directions in different pipe assemblies 12.

In operation, oil which contains amorphous wax is lead through each of the inner pipes 16. A coolant at a temperature considerably lower than the oil flows through the annular spaces between the outer pipes 14 and the inner pipes 16. This lowers the temperature of the inner pipes 16 to a point where wax will crystallize on the inner surface of the inner pipes 16. The shafts 18 rotate so that the blades 24 remove particles of the accumulated crystalline wax from the pipe 16. The particles of removed wax are large enough that they can be filtered out downstream of the chiller 10.

Conventionally, the shafts 18 do not rotate while the wax is allowed to accumulate on the inner pipe 16. After a predetermined time, the shafts rotate to break away the accumulated wax and to clean the inner surface of the pipes 16 to provide for good heat transfer and subsequent formation of wax crystals.

It has been found that the spring mechanisms can be damaged when the shafts are suddenly rotated because of the high starting torques required to move the blades 24 through the accumulated crystalline wax. The present invention provides a control which allows the blade mechanisms 20 to rotate at a speed low enough to permit optimum growth rate of the wax crystals on the inner pipe 16. This rate of rotation is maintained for a predetermined time. Thereafter and before effective wax removal becomes impossible, the rate of rotation is increased sharply to clean the inner surface of the pipe 16 so that it is free from wax to permit wax crystals to form at the desired rate of growth. During the time when the blade mechanisms 20 rotate at their slowest speed, they are removing particles of wax from the inner pipe 16, but are not rotating fast enough to prevent the wax from crystallizing at a rate which will permit the formation of wax in which there is entrained little or no oil. In practice, it has been found in tests that superior crystal growth rates can be attained if the shafts are rotated at approximately two (2) r.p.m. for 13 minutes and then rotated at approximately twenty (20) r.p.m. for two minutes.

The present control system provides a means of controlling the time the shafts 18 rotate at their slower rotational speed and the time they rotate at their higher rotational speed, and at the same time provide a control which permits the exertion of considerable torque even when there is a high ratio between the higher and lower rotational speeds.

To that end, the present control system has a reservoir 34 filled with hydraulic fluid which is not to be confused with the oil being processed in the chiller 10. Pumps 36 in oil lines 38 extending into the reservoir force the hydraulic fluid from the reservoir and through the lines 38 into a supply line 40. The supply line 40 supplies hydraulic fluid to any and all of the exchangers and chillers in the oil processing plant which use control systems similar to the one which is shown in FIG. 1. Since they would all be identical or at least similar, only one is shown for the sake of clarity. Branch lines 42 from the supply line 40 supply hydraulic fluid to each of the control systems.

The fluid coming through the branch pipe 42 which supplies fluid to the control system shown in FIG. 1 goes through a valve 44 in the branch line to the parallel lines 46 and 48. The parallel line 46 has in it an adjustable valve 50 and parallel line 48 has in it an adjustable valve 52. The parallel line 46 also has in it a motor speed control valve 54 and the parallel line 48 also has a motor speed control valve 55. The motor speed control valves 54 and 55 are both actuated by a timer 56.

The timer 56 can be one which is commercially available and therefore will not be explained in detail herein. Basically, it closes the valve 54 and simultaneously opens the valve 55 and then after a predetermined time opens the valve 54 and simultaneously closes the valve 55. After another predetermined interval of time, the timer 56 actuates the valves 54 and 55 to start the cycle anew. The oil coming through the parallel lines 46 and 48 empties into a motor supply conduit 56, then flows through the energizes a hydraulic motor 58. The fluid leaves the motor 58 through a hydraulic exhaust line 60 which connects the motor 58 to a return line 62 which empties the oil back into the reservoir 34.

Other return lines 60, from other control systems not shown, also return hydraulic oil to the return lines 62 so that all of the hydraulic oil used in the control systems is eventually returned to the reservoir 34 where it begins its cycle through the control system anew.

The valves 50 and 52 are adjusted and the timer 56 is set so that when the timer 56 opens the valve 54 and closes the valve 55, oil is flowed only through the valves 54, 50 and the parallel line 46, and the hydraulic fluid sent to the hydraulic motor 58 will be just enough to rotate the motor 58 at a speed to drive the driver sprocket 33 at the desired lower rotational speed for a predetermined time. The timer 56 will then close the valve 54 and open the valve 55 so that the amount of oil which is allowed to flow through the parallel line 48 will be enough to drive the motor 58 at a speed to turn the shafts 18 at the higher rate of rotation for a predetermined time.

The motor 58 drives a shaft 64 which leads to a gear reducer 66 which rotates a shaft 68 which in turn rotates the driver sprocket 33. The timer 56, as well as the valves 50, 52 and 44 are part of a control panel 70, for convenience. A rotational speed indicator 72, shown schematically connected to the shaft 68, is also provided so that an operator can be aware of the rotational speed of the shaft 68 and scraper mechanisms 20 and ascertain that they are rotating at the lower rotational speed and higher rotational speed for the desired periods.

The motor speed control valves 54 and 55 may also be mounted to the control panel 70. In the preferred embodiment, the motor speed control valves 54 and 55 are solenoid valves. They are energized through wires 74 and 76 which connect the motor speed control valves 54 and 55 respectively to the timer 56.

The foregoing describes but one preferred embodiment of the present invention, other embodiments being possible without exceeding the scope as defined in the following claims.

What is claimed is:

1. In the unit for crystallizing and removing wax from oil containing amorphous wax, said unit having an inner pipe, a coaxial outer pipe and a rotatable scraper mechanism within said inner pipe, said scraper mechanism having a blade in engagement with the inner surface of said inner pipe, a system for rotating and controlling the rotational speed of said scraper mechanism comprising:
   a hydraulic motor, said hydraulic motor connected with said scraper mechanism to rotate said scraper mechanism;
   a first hydraulic line connected with said motor to feed hydraulic fluid to said motor;
   a second hydraulic line connected and parallel with said first hydraulic line and connected with said motor to feed hydraulic fluid to said motor;
   a first motor speed control valve in said first parallel hydraulic line; and
   an automatic timer connected to said motor speed control valve and operable to open said motor speed control valve for a predetermined time and then to close said motor speed control valve for another predetermined time;
whereby when oil containing amorphous wax is flowed through said inner pipe and a coolant is flowed through the space between said inner pipe and said outer pipe, said first motor speed control valve will be closed for said other predetermined time during which hydraulic fluid will flow through said second parallel hydraulic line to run said motor at a slow speed which allows an optimum rate of crystal growth on said inner pipe and said motor speed control valve will alternately be opened for said one predetermined period of time so that hydraulic fluid flows through said first parallel hydraulic line to said motor to operate said motor at a speed sufficient to clean the inner surface of said inner pipe.

2. The structure defined in claim 1 further comprising two flow adjusting valves, one in each of said parallel hydraulic lines so that the amount of hydraulic fluid flowed to said hydraulic motor can be adljusted for one or both of the speeds said motor rotates.

3. The structure defined in claim 2 further comprising a second motor speed control valve in said second parallel line, said automatic timer being operable to close said second motor speed control valve while opening said first motor speed control valve and then to open said second motor speed control valve while closing said first motor speed control valve.

4. The structure defined in claim 3 wherein said motor speed control valves are solenoid valves.

5. The structure defined in claim 3 further comprising a supply line, a branch line connected between said supply line and said first and second parallel hydraulic lines and an adjusting valve in said branch line, said supply line conducting hydraulic fluid to said branch line for eventual flow through said first and second parallel hydraulic lines whereby the total amount of fluid available for said parallel lines can be adjusted by said adjustable valve in said branch line.

6. The structure defined in claim 3 further comprising a gear reducer connected between said hydraulic motor and said scraper so that said scraper rotates at a speed lower than said hydraulic motor.

7. The structure defined in claim 6 further comprising a rotational speed indicator connected with said scraper mechanism to indicate the rotational speed of said scraper mechanism.

8. A unit for crystallizing and removing wax from oil containing amorphous wax comprising:
   an outer pipe;
   an inner pipe coaxial with an inside of said outer pipe;
   a rotatable scraper mechanism within said inner pipe;
   a blade mounted on said scraper mechanism, said blade being engaged with the inner surface of said inner pipe;
   a hydraulic motor, said hydraulic motor connected with said scraper mechanism to rotate said scraper mechanism;
   a first hydraulic line connected with said motor to feed hydraulic fluid to said motor;
   a second hydraulic line connected in parallel with said first hydraulic line and connected with said motor to feed hydraulic fluid to said motor;
   a first motor speed control valve in said first parallel hydraulic line; and
   an automatic timer connected with said first motor speed control valve and operable to open said first motor speed control valve for a predetermined time and then close said first motor speed control valve for another predetermined time;
whereby when oil containing amorphous wax is flowed through said inner pipe and a coolant flowed through the space between said inner pipe and said outer pipe, said first motor speed control valve will be closed for said other predetermined time during which hydraulic fluid will flow through said second parallel hydraulic line to run said motor at a slow speed which allows an optimum rate of crystal growth on said inner pipe and said motor speed control valve will alternately be open for said one predetermined period of time so that hydraulic fluid flows through said first parallel hydraulic line to said motor to operate said motor at speed sufficient to clean the inner surface of said inner pipe.

9. The structure defined in claim 8 further comprising a flow adjusting valve in each of said first and second hydraulic lines so that the amount of hydraulic fluid flowed to said hydraulic motor can be adjusted for one or both of the speeds said motor rotates.

10. The structure defined in claim 9 further comprising a supply line, a branch line connected between said supply line and said first and second parallel hydraulic lines and an adjusting valve in said branch line, said supply line conducting hydraulic fluid to said branch line for eventual flow through said first and second hydraulic lines whereby the total amount of fluid available for said first and second hydraulic lines can be adjusted by said adjustable valve in said branch line.

11. The structure defined in claim 9 further comprising a gear reducer connected between said hydraulic motor and said scraper so that said scraper rotates at a speed lower than said hydraulic motor.

12. The structure defined in claim 11 further comprising a rotational speed indicator connected with said scraper mechanism to indicate the rotational speed of said scraper mechanism.

References Cited

UNITED STATES PATENTS

| | | | |
|---|---|---|---|
| 3,729,177 | 4/1973 | Keyes et al. | 259—10 |
| 3,159,563 | 12/1964 | Anastasoff et al. | 196—14.5 |
| 1,956,613 | 5/1934 | Corn et al. | 165—94 |

WILBUR L. BASCOMB, Jr., Primary Examiner

D. SANDERS, Assistant Examiner

U.S. Cl. X.R.

62—58; 165—94, 95